United States Patent [19]
Anderson, Jr. et al.

[11] Patent Number: 5,320,069
[45] Date of Patent: Jun. 14, 1994

[54] SMALL ANIMAL RESTRAINT DEVICE

[75] Inventors: George W. Anderson, Jr., Frankfurt, Fed. Rep. of Germany; Wade B. Lawrence, East Falmouth, Mass.; Jae-Ouk Lee, Daejeon, Rep. of Korea; Michael J. Young, Middletown, Md.

[73] Assignee: The United States of America as represented by the Secretary of the Army, Washington, D.C.

[21] Appl. No.: 875,616

[22] Filed: Apr. 28, 1992

[51] Int. Cl.$^5$ .............................................. A01K 29/00
[52] U.S. Cl. ...................................... 119/751; 119/757
[58] Field of Search ................... 119/96, 103, 15, 97.1, 119/97.2, 98, 729, 751, 752, 753, 757, 837; 606/107, 116, 117, 162

[56] References Cited

U.S. PATENT DOCUMENTS

| | | | |
|---|---|---|---|
| 1,398,484 | 11/1921 | Holding | 119/98 |
| 2,540,650 | 2/1951 | Brosene, Jr. et al. | 119/98 |
| 3,137,273 | 6/1964 | Greenwood | 119/103 |
| 3,474,763 | 10/1969 | Kissil et al. | 119/103 |
| 3,528,435 | 9/1970 | Morrissey | 119/103 |
| 3,625,185 | 12/1971 | Kester | 119/103 |
| 3,739,751 | 6/1973 | Mohr et al. | 119/103 |
| 4,709,660 | 12/1987 | Hrushesky | 119/103 |

FOREIGN PATENT DOCUMENTS

| | | | |
|---|---|---|---|
| 2251216 | 5/1974 | Fed. Rep. of Germany | 119/15 |
| 2390939 | 1/1979 | France | 119/103 |
| 1242156 | 7/1986 | U.S.S.R. | 119/98 |

*Primary Examiner*—John J. Wilson
*Assistant Examiner*—Todd E. Manahan
*Attorney, Agent, or Firm*—Werten F. W. Bellamy; John F. Moran

[57] ABSTRACT

An improved small animal restraint device is provided which enables an individual to conduct ocular examinations of a small animal. The device minimizes manipulation of the eyes of the animal and eliminates recovery time associated with anesthetics, while also reducing examination time. The restraint device comprises a cylinder having a longitudinal slot in the wall thereof. A conical member which is attached to one end of the cylinder includes a pair of eye openings in the upper wall thereof and a nose opening at the apex thereof. A plunger placed in the cylinder at the other end thereof assists in holding the animal in place. A set screw, which extends through the slot in the wall of the cylinder, secures the plunger in place.

9 Claims, 1 Drawing Sheet

SMALL ANIMAL RESTRAINT DEVICE

FIELD OF THE INVENTION

This invention relates to restraint devices for small animals and, more particularly, to a restraint devices that allows ophthalmic examination of unanesthetized animals.

BACKGROUND OF THE INVENTION

Rift Valley fever (RVF), a viral disease endemic throughout Africa, frequently causes severe ocular sequelae in humans. Infection of inbred rats, *Rattus norvegicus*, has been shown to mimic several of the clinical manifestations of the human disease. For clinical study of this disease, a restraint device was needed which would allow large numbers of unanesthetized, infected rats to be easily screened by one individual.

Currently, there are no commercially available restraint devices that are suitable for ophthalmic examination of unanesthetized rats. Most restraint devices are designed for administering inoculations or studies involving physiological or behavioral measurements. One device which would allow ophthalmic examinations is described in H. C. Ebel, "A Restraining Device for Use in the Measurement of Eyelid Responses in Laboratory Rats," J. Exp Anal. Behav. (1966) 9:605–606. However, this device is cumbersome and requires the rats to be lightly anesthetized.

Several U.S. Patents disclose restraint device devices for small animals. U.S. Pat. No. 2,987,042 (Rothberg) discloses a hollow device having a concave upper surface. The animal is straddled over the concave surfaces and is strapped to the outer surface of this device.

U.S. Pat. No. 3,094,101 (Porter) discloses a restraining device for small animals comprising an elongated cage portion having side walls provided with slide guides for supporting a longitudinally slidable and vertically adjustable floor member. A vertically adjustable end wall is provided with a tail holder for preventing the movement of the specimen's tail.

U.S. Pat. No. 3,428,030 (Updegraff) discloses a restraining device which allows an individual to provide an intravenous injection to the specimen.

U.S. Pat. No. 3,474,763 (Kiss et al.) discloses a restraining device which allow the specimen's legs and tail to be exposed. This device fails to provide any means for observing the eyes of the specimen.

U.S. Pat. No. 3,625,185 (Kenter) discloses a restraining device having an adjustable cylindrical section, a gate at one end of the cylinder, and a variable closure at the other end of the cylinder.

A major disadvantage of the restraints described above is that the restraints do not, in general, permit a researcher to quickly and easily observe the eyes of unanesthetized animal. Further, in some instances, the restraint devices are unsuitable for ophthalmic examination, since the eyes of the animal are covered or otherwise made inaccessible by the restraint device itself.

SUMMARY OF THE INVENTION

According to the invention, a small animal restraint device is provided which provides a number of important advantages over restraint devices of the prior art. These advantages included enabling an individual to conduct ocular examinations of a small animal, minimizing manipulations of the eyes of the animal, eliminating recovery time associated with anesthetics, reducing examination time.

The restraint device of the invention comprises a cylindrical body or housing having an open and a longitudinal slot through a wall of the body. A conical member is attached to the end of the cylindrical body opposite to the open end and includes eye openings which can be aligned with the eyes of the small animal. A plunger member in engagement with the inner surface of the body is movable along the body to confine the animal within the body. A securing means secures the plunger member in place within the body to form a cavity in which the animal is held. Other features and advantages of the invention will be set forth in, or apparent from, the following detailed description of the preferred embodiment of the invention.

DESCRIPTION OF THE PREFERRED EMBODIMENTS

Figure 1:
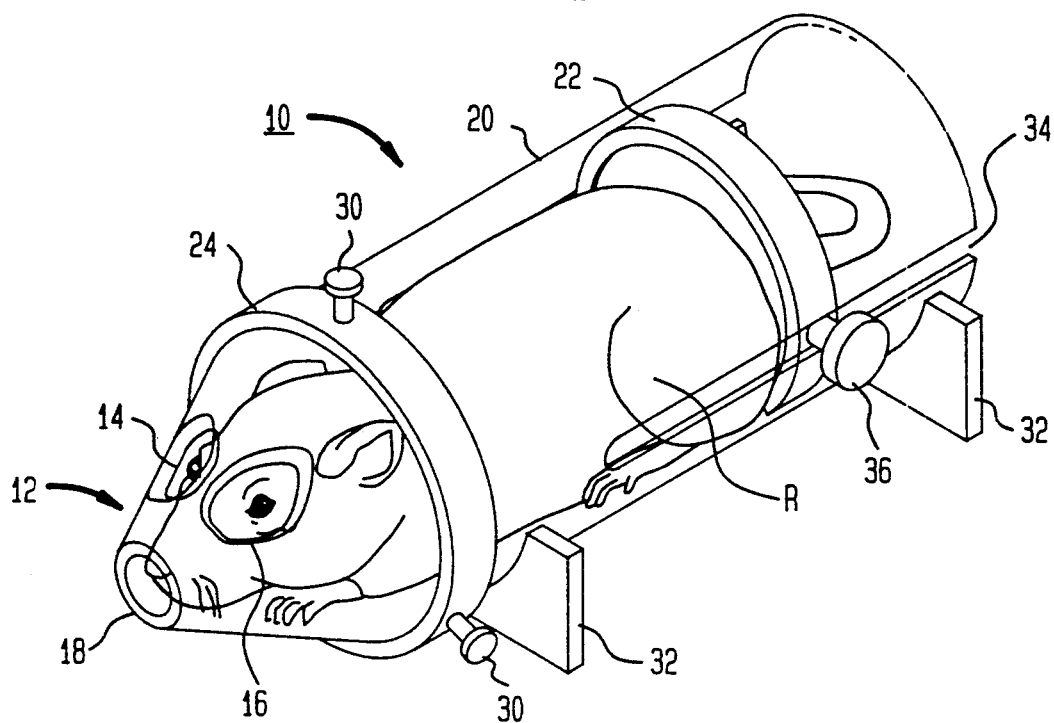
FIG. 1 is a perspective view of a small animal restraint device constructed in accordance with a preferred embodiment of the invention.
Figure 2:
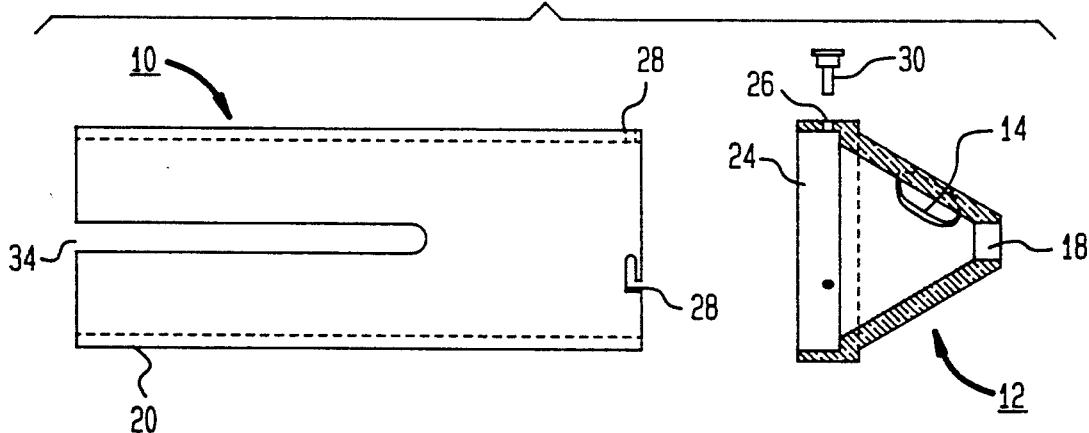
FIG. 2 is an exploded side elevational view of the restraint device of FIG. 1, showing key components thereof.
Figure 3:
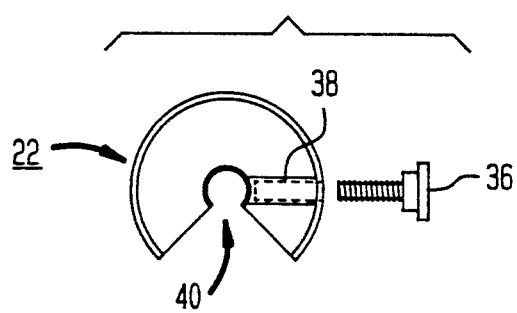
FIG. 3 is a front elevational view of a plunger member utilized in the restraint device of FIG. 1.

Referring to FIGS. 1, 2 and 3, a small animal restraint device, generally denoted 10, is illustrated. The small animal restraint device 10 comprises the following major units or components: a nosecone 12, a cylindrical body 20, and a plunger 22.

The nosecone 12, which is best seen in FIGS. 1 and 2, has a generally conical shape which is preferably machined from a solid piece of plexiglass. The nosecone 12 is provided with upper circumferencially spaced eye opening 14 and 16 for the eyes of rat R and nose opening 18 at the apex thereof for the nose of rat R. The nosecone 12 further includes a flange 24 at the base thereof. In the preferred embodiment under consideration, there are three threaded holes 26 through the flange 24. Flange 24 fits over cylinder 20 so as to allow the three circumferential slits 28 in cylinder 20 to be aligned with the holes 26. The nosecone 12 is secured to the cylinder 20 by three thumb screws 30, which engage the circumferential slits 28 in the cylinder 20 and the threaded holes 26. Slits 28 allow the nosecone 12 to be rotated clockwise or counterclockwise so as to enable alignment of the eye openings 14 and 16 with the eyes of the rat R.

The cylindrical body or cylinder 20 is preferably made of plexiglass and an optional base 32 can be attached to the cylinder 20 to provide support thereof. As stated above, three slits 28 are machined on the front of the cylinder to accept the shanks of the nosecone thumb screws 30. A fourth longitudinal slit 34 is provided in on side of cylinder 20 which accepts the shank of a large, knurled thumb screw 36 that extends through slit 34 to engage plunger 22.

The plunger 22 is preferably constructed of teflon and, as shown in FIG. 3, includes a threaded opening 38 therein which accepts the threaded shank of the knurled thumb screw 36. A lower recess 40 in the plunger 22 allows space for the tail of rat R or another small animal. The shape of recess 40 is generally triangular with a circular opening being provided at the apex of the triangle.

It is noted that cylinders of different sizes are required for rats of different sizes, it being contemplated that four different sized cylinders would accommodate most rats. It is also noted that the device of the invention is similar in this regard to the commercially available "Broome"-style restraint (Harvard Bioscience Whole Rat Catalog, Harvard Bioscience, Pleasant Street, South Natick, Mass.) in that the device of the invention relies on cylinders of different sizes and a plunger to fix or hold the animal in the cylinder.

Considering the overall operation of the small animal restraint device 10, the rat R readily enters the rear opening of the cylinder 20 when plunger 22 is removed and cylinder 20 is tilted upward and placed in front of the rat. Once the rat R is inside, the plunger 22 is inserted behind the rat R. Gentle traction on the rat's tail causes the rat to move forward in the cylinder 20. Further movement of the rat 42 is then restricted by applying a mild forward pressure on the plunger 22, and securing the plunger in place with the knurled thumbscrew 36.

As rats are nose-breathers, breathing is facilitated by the opening 18 for the rat's nares in the end of the nosecone 12. Minor adjustments in the position of the nose cone 12 are made by rotating the cone 12 to allow full exposure of the eyes of the rat through openings 14 and 16. Once these adjustments are complete, the nosecone 12 is firmly secured to the cylinder 20 by tightening thumb screws 30.

The restraining device 10 has been used to examine rats which are infected with Rift Valley Fever virus. Ophthalmic examinations were conducted by utilizing an ophthalmoscope, preferably a direct pupil device which is manufactured by Keeler Instruments of Broomall, Pa. A Kowa RC2 fundus camera was utilized to record the condition of the eyes of the rat. Best results from the fundus camera is achieved by first trimming the whiskers of the rat and placing the camera as close to the eye of the rat as the nosecone 12 will allow.

Although the present invention has been described to specific exemplary embodiments thereof, it will be understood by those skilled in the art that variations and modifications can be effected in these exemplary embodiments without departing from the scope and spirit of the invention.

What is claimed is:

1. A small animal restraint device for enabling ophthalmic examination of animals to be performed, said restraint device comprising:

a cylindrical body having an open end and including a longitudinal slot in a wall thereof;

a conical member attached to an end of said cylindrical body opposite said open end and including two eye openings therein adapted to be aligned with the eyes of said small animal;

a plunger member in engagement with an inner surface of said cylindrical body and movable along said cylindrical body; and securing means for securing said plunger member in place within said cylindrical body to form a cavity in which said small animal is held.

2. The restraint device recited in claim 1 wherein said conical member is removably attached to said cylindrical body.

3. The restraint device recited in claim 1 wherein said conical member is rotatable about said cylindrical body.

4. The restraint device recited in claim 1 wherein said conical member further comprises a truncated apex having an opening therein for allowing said small animal to respire.

5. The restraint device recited in claim 1 wherein said cylindrical body further comprises three circumferential slits therein for allowing said conical member to be orientated and secured thereto.

6. The restraint device recited in claim 1 wherein said plunger member further comprises an orifice to allow a tail of said small animal to extend through said plunger member.

7. The restraint device recited in claim 1 wherein said plunger member further comprises a radially extending threaded opening therein for receiving a locking screw constituting said securing means.

8. The restraint device recited in claim 1 wherein said means for securing said plunger member in place comprises a screw which extends through said longitudinal slot and engages said plunger member so as to secure said plunger member to said cylindrical body.

9. A small animal restraint device for enabling ophthalmic examination of animals to be performed, said restraint device comprising:

a cylindrical body having an open end and including a longitudinal slot in a wall thereof;

a conical member attached to one end of said cylindrical body, said conical member having two eye openings adapted to be aligned with the eyes of said small animal and a truncated apex having an opening therein for allowing said small animal to respire;

a plunger member in engagement with an inner surface of said cylindrical body, said plunger member having a radially extending threaded opening therein; and a locking screw extending through said longitudinal slot into said threaded opening for engaging said plunger member so as to fix said plunger member in position and thereby form a cavity in said cylindrical body in which said small animal is held.

* * * * *